Oct. 28, 1941.  A. L. McKINNON  2,260,629

ARTICLE OF MANUFACTURE

Filed June 24, 1939

INVENTOR
ARCHIBALD L. McKINNON
BY
Beau, Brooks, Buckley & Beau.
ATTORNEYS

Patented Oct. 28, 1941

2,260,629

UNITED STATES PATENT OFFICE 2,260,629

ARTICLE OF MANUFACTURE

Archibald L. McKinnon, St. Catharines, Ontario, Canada, assignor to Columbus McKinnon Chain Corp., Tonawanda, N. Y., a corporation of New York Application June 24, 1939, Serial No. 281,041

1 Claim. (Cl. 59—78)

My invention relates in general to an article of manufacture, and particularly to a chain made of alloy steel and from stock of the larger cross-sectional areas.

It is well known to those skilled in the art that it has been the practice heretofore in making links from chain stock of the larger cross-sectional area to provide a plurality of individual links formed from chain link stock bent by suitable means in the desired form and shaped with open ends, which are scarfed. After heating the scarfed ends to welding temperature, the links are assembled one at a time and each is immediately welded by a "fire weld" which consists, as is well known, in bringing such heated, scarfed ends together and forging them by a rapid hammering action, while at such welding temperature. Such a method, however, is not applicable to links which are made of alloy steel, since the tolerances as to welding temperature of such steel is so limited that a different kind of a weld is required, and also because of the fact that the presence of some alloys in the steel make it unsuitable for fire welding. Furthermore, when chains are made in the above described manner, the completed chain has as many welded joints as the number of links contained in the chain.

The principal object of my invention has been to provide a chain having links made in the form of drop forgings, each alternate link of the chain being in the form of a continuous closed or solid ring having no ends.

Another object has been to provide a plurality of split links designed to have their ends temporarily spread for receiving adjacent solid links, said ends being suitably shaped for subsequent welding, thereby forming a chain having substantially one-half of its links welded.

Moreover, it has been an object to provide a chain having solid and split links, the ends of the split links being united by the atomic hydrogen method.

Furthermore, my chain is so constructed as to give maximum strength and, at the same time, economy of manufacture.

The above objects and advantages have been accomplished by the chain shown in the accompanying drawing, of which:

Figure 1:
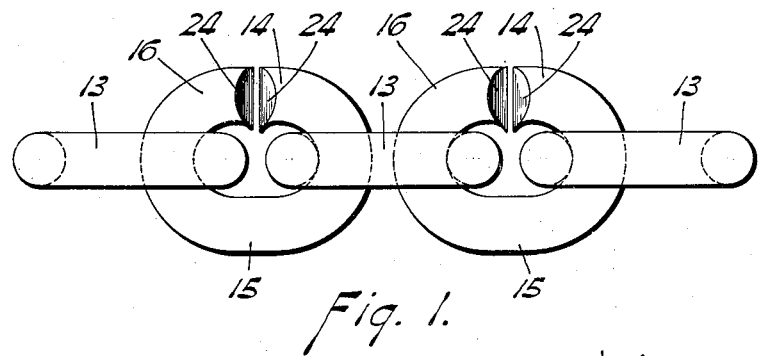
Fig. 1 is an elevation of my chain made up of three solid links and two split links, showing the split links unwelded.
Figure 2:
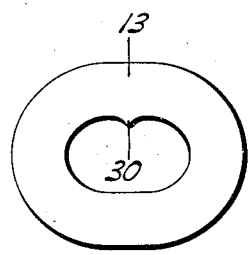
Fig. 2 is an elevation of one of the solid links.
Figure 3:
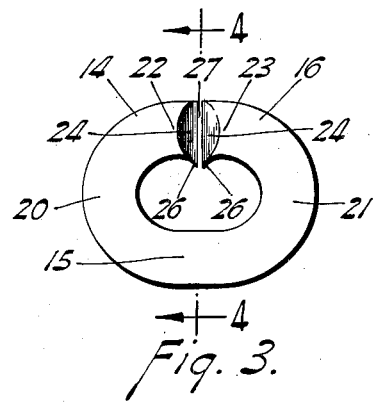
Fig. 3 is a similar view of one of the split links.

My chain comprises a plurality of alternate solid links 13 and split links 14. Both forms of links are preferably made by a drop-forging process and the solid links are formed with the sides thereof closed in the form of an endless ring, as clearly shown in Fig. 2. The split links are each forged with the stock ends slightly separated by a gap 27, as shown in Fig. 3.

Figure 6:
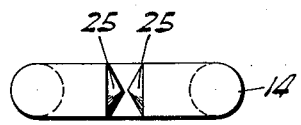
Fig. 6 is a side elevation of a split link showing a different modified form of point.
Figure 5:
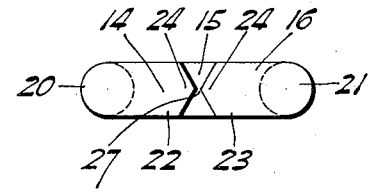
Fig. 5 is a side elevation of the split link of Fig. 4.

The split links are each formed with a solid side 15 and a split side 16 joined by link ends 20 and 21. The stock ends 22 and 23 formed on the split side 16 of the link, having the gap 27 therebetween, are arranged in substantial juxtaposition. Each of the stock ends 22 and 23 of each split link is formed with a tip 24 to facilitate welding. The specific shape of such tips depends upon what form of welding is to be employed in uniting them. In the form shown in the drawing, chisel-shaped tips are employed which are substantially symmetrical in shape and are tapered from an axial plane outwardly toward the periphery of the stock. This chisel-shaped tip is best suited to the use of parent metal for filling in the V-shaped openings between the stock ends when welding the split links. In Fig. 6 I show a modified form of stock tip 25 shaped in the form of a cone. This shape is preferred where the ends of the stock are to be united by electric resistance butt welding.

Figure 4:
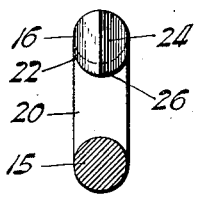
Fig. 4 is a sectional view taken on line 4—4 of Fig. 3.

It is customary in some forms of links to have the cross-sectional area through the welded portion greater than the cross-sectional area of the stock from which the link is made, and such reinforcement is preferably located on the inside of the link. To this end I provide each of the tips 24 with an inwardly extending projection 26 which is preferably semi-circular, as shown in Fig. 4, and which provides an inwardly extending reinforcement when the tips are joined by welding. So as to make each of the solid links 13 of the same shape as the split links 14, I preferably provide a reinforcing projection 30 extending from one of the sides of each of these links.

As hereinbefore stated, the solid and split links of my chain are alternately arranged and each of the split links is used to connect two adjacent solid links. In making my chain, each split link which is preferably forged with its ends in juxtaposition has its ends separated. Such separation may be brought about either by rotating the link ends 20 and 21 relatively in opposite directions upon an axis preferably located in the solid side 15 of the link or, if desired, by spreading the stock ends by a backward bending movement in the side 15. After the two solid links have been assembled in the opened split link, the stock ends of the link are closed up and moved into juxtaposition by reverse movement of the link ends. Any suitable apparatus may be employed to hold one end of the split link while the other end is turned or bent, and such movement is preferably accomplished when the link is heated.

Figure 7:
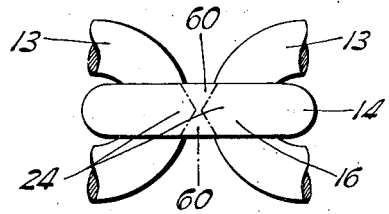
Fig. 7 is a fragmentary elevation of a portion of my chain showing a single split link as it appears when welded.

After my chain is formed and assembled as above pointed out, the split links are welded. The spaces between the ends at the joint, if of V-shape, may be filled in with parent metal, as shown at 60 in Fig. 7 or, if the ends are of cone-shaped formation, as shown in Fig. 6, it is preferable to join them by an electric resistance weld. When of V-shape formation and parent metal is used, the metal is applied to the openings preferably by means of the atomic hydrogen process, but where a steel rod is to be used oxy-acetylene or electricity may be used as the welding medium.

Obviously, some modifications of the details herein shown and described may be made without departing from the spirit of my invention or the scope of the appended claim and I do not, therefore, wish to be limited to the exact embodiment herein shown and described, the form shown being merely preferred embodiment thereof.

Having thus described my invention, what I claim is:

As an article of manufacture, a heavy duty chain comprising a plurality of initially formed closed, seamless links and single piece split links of one convolution, said closed and split links being alternately arranged, each of said split links being initially formed with its ends separated to permit spreading thereof to assemble adjacent solid links therewith, and the end of said split links being united by the material of the link in a single welded joint following assembly.

ARCHIBALD L. McKINNON.